April 27, 1937.                J. M. MARTI                2,078,678
          ELASTIC TRANSMISSION RING FOR SPINDLES
           AND PROCESS FOR MANUFACTURING THE SAME
                   Filed Feb. 28, 1936
Fig. 1.
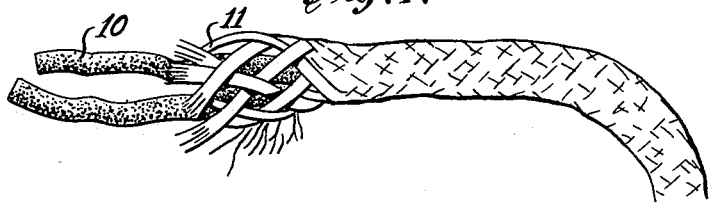
Fig. 2.
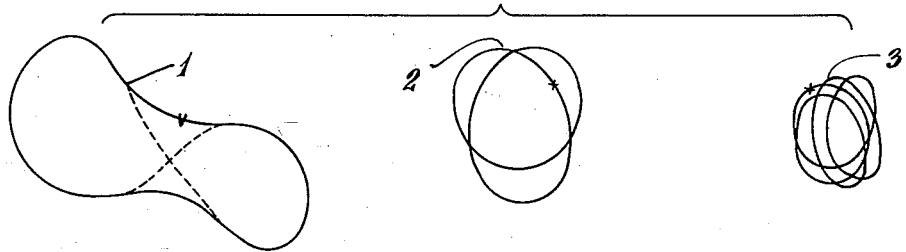
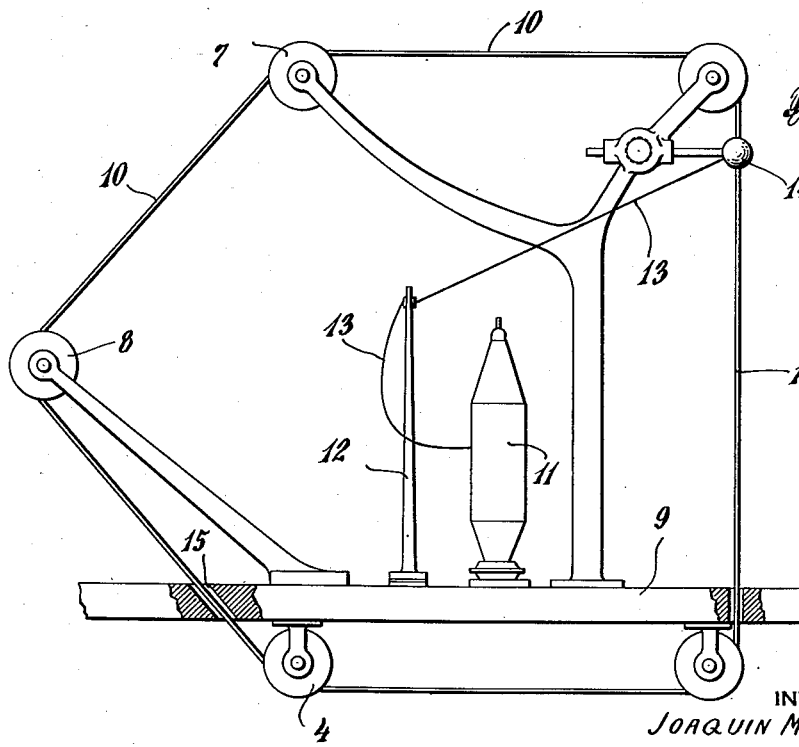
Fig. 3.
INVENTOR
JOAQUIN MONTANE MARTI
BY
Haseltine, Lake & Co.
his ATTORNEYS Patented Apr. 27, 1937

2,078,678

UNITED STATES PATENT OFFICE 2,078,678

ELASTIC TRANSMISSION RING FOR SPINDLES AND PROCESS FOR MANUFACTURING THE SAME

Joaquin Montane Marti, Sabadell, Spain

Application February 28, 1936, Serial No. 66,185
In Spain March 2, 1935

1 Claim. (Cl. 96—26)

This invention refers to transmissions or drive means running at great lineal speed where little power of transmission is required, especially in the textile machinery for spinning and twisting for moving the spindles in the so-called self-acting machines. In this kind of machines the transmission of the movement of rotation to the spindles has usually been carried out by means of simple strings or knotted ribbons, and the durability of these means of transmission is very limited, for which reason the spinning machines have to be stopped frequently in order to change said deteriorated drive means for new ones.

This invention serves to substitute for the present means for driving of the spindles, other endless drive means, that is to say, and in the first place is intended to eliminate the usual knot or splice and to obtain in the second place a certain elasticity which permits a position, correct at all times, of the transmission ribbons in the grooves of the wheels, without making, however, a sensible pressure on the axle. Since the spinning or twisting machines have hundreds or thousands of axles in rotation, the effort to overcome the friction due to the rigid and excessively tense transmission is multiplied in such a form that such a machine according to the class of said transmissions may consume from 20 to 50% more or less power.

A purpose of the new transmission, which shall be described herein, consists in reducing notably in these machines the power necessary for their operation.

The characteristic of the invention consists in that the transmission cords are endless, have a rubber core constituted by various threads of elastic rubber, and one or several plaited or braided covers of any textile fiber, preferably cotton, which textile covers restrict within predetermined limits the coefficient of longitudinal elasticity of the interior rubber core. It is known that any plaited or braided string, according to the angle formed by its threads with the longitudinal imaginary axis, has a certain longitudinal elasticity. The plaited cover or covers around the rubber core are plaited in such a manner that when pulling in a longitudinal direction movement is allowed, but naturally when stretching the plaited tube which encloses the rubber core, its diameter is reduced until a longitudinal stretching is only possible by compressing the rubber core. At this moment the elasticity of the cord is not due to the longitudinal elasticity of the thread or threads of the interior rubber core, but to the compressibility of said rubber core. The resistance to the longitudinal traction, when it concerns groups of thin rubber threads as the core and a tube of open plaiting, is low and it notably increases at the time when the exterior textile cover compresses the rubber core. This "hard" elasticity is that availed of in the first place in the element of transmission of the spindles once the strings are in their place, and the elasticity of the first phase of stretching which we will call "soft" is utilized during the mounting of the transmissions facilitating it enormously.

The rubber core will be advantageously obtained by making a single knot forming a ring which has several times the diameter of the string desired, and by turning this ring upon itself there is obtained a ring of various threads, for example 2, 4 or 8. This interior rubber core is mounted on any plaiting or braiding machine in which there have been made lateral openings which permit the introduction in the same of a closed ring, for guide-rollers are conveniently placed below and above the machine on which the spindles turn. Naturally there is no obstacle to the use of a horizontal machine instead of a vertical one. By means of these machines the interior core is covered with one or several covers and, after the first turn, the only knot that exists for joining the two ends of the rubber thread may be untied, since on account of friction among themselves under the plaited cover, the threads will not displace. As may be readily understood, with the device described there may be applied as many covers as desired.

After the plaiting or braiding is finished, the endless cords thus obtained are subjected to an impregnation of rubber in the form of an organic solution or in the form of aqueous suspension, such as the latex of caoutchouc. These impregnating liquids may have the necessary ingredients of vulcanization in order that after drying, the whole may become vulcanized by exposing it to heat in accordance with well known processes.

The accompanying drawing illustrates the invention:

Fig. 1 shows a portion of the elastic ring allowing the interior rubber threads to be seen as well as the exterior plaited or braided tube covering them.

Fig. 2 are three phases designed which show how from a large ring formed by one rubber thread is made a smaller ring of several threads.

Fig. 3 shows schematically a normal plaiting or braiding machine which works in a vertical position.

In the practice of my invention, 1 is a large ring or belt knotted or tied at only one point, 2 is the same ring 1 after being turned upon itself, and 3 is the ring 2 after being turned upon itself. Ring belt 3 has therefore four parallel threads.

4, 5, 6 and 7 are fixed guide-rollers and 8 is a movable guide-roller which serves to guide the core in reasonably tense condition. 9 is the horizontal table on which the spindles move, 10 is the rubber core, 11 is a spindle, 12 is a thread-guide, 13 is a thread of the material intended for the exterior plaited or braided cover, 14 is the point where the different threads of the other spindles (not shown) join, forming a plaiting or braiding in the form of a tube and 15 is an opening made expressly in a normal machine for the purpose of permitting the mounting of a rubber endless ring for being covered by braiding or plaiting.

Having now described my invention, I claim:

A process for manufacturing elastic drive belts for driving high speed spindles in spinning machines, which consists in forming an inner endless core from a single thin rubber thread by giving the same several turns and joining the two ends thereof by knotting the same, covering said core with at least one textile cover by interlacing a plurality of textile fiber threads in a layer upon said core, untying the knot uniting the ends of the core after applying the first cover on the latter in order to eliminate any resulting protuberances and obtain a uniform belt, impregnating and treating the belt thus obtained with a fluid rubber preparation preparatory to vulcanization and finally vulcanizing the treated belt in order to obtain the final product.

JOAQUIN MONTANE MARTI.